May 19, 1931.  U. A. WHITAKER  1,806,567
COUPLER UNLATCHING DEVICE
Filed Sept. 17, 1928  2 Sheets-Sheet 1
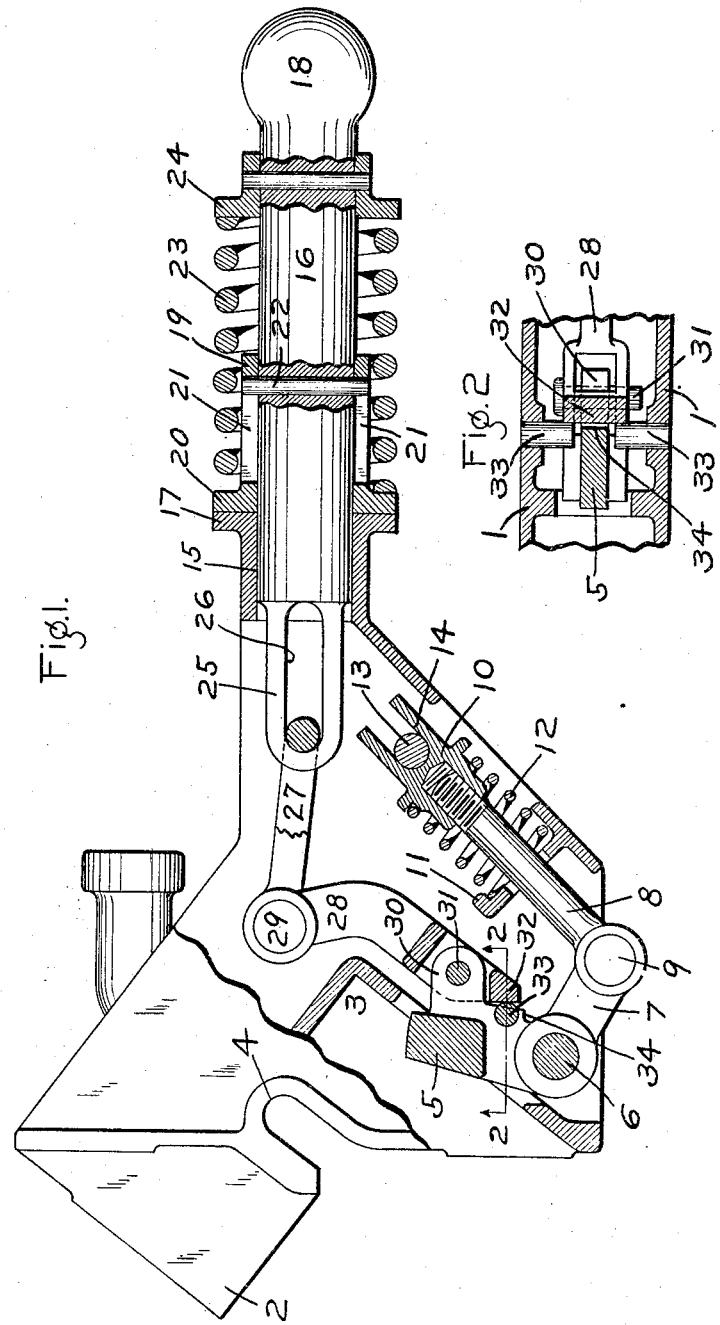
INVENTOR
UNCAS A. WHITAKER
BY *Wm. M. Cady*
ATTORNEY

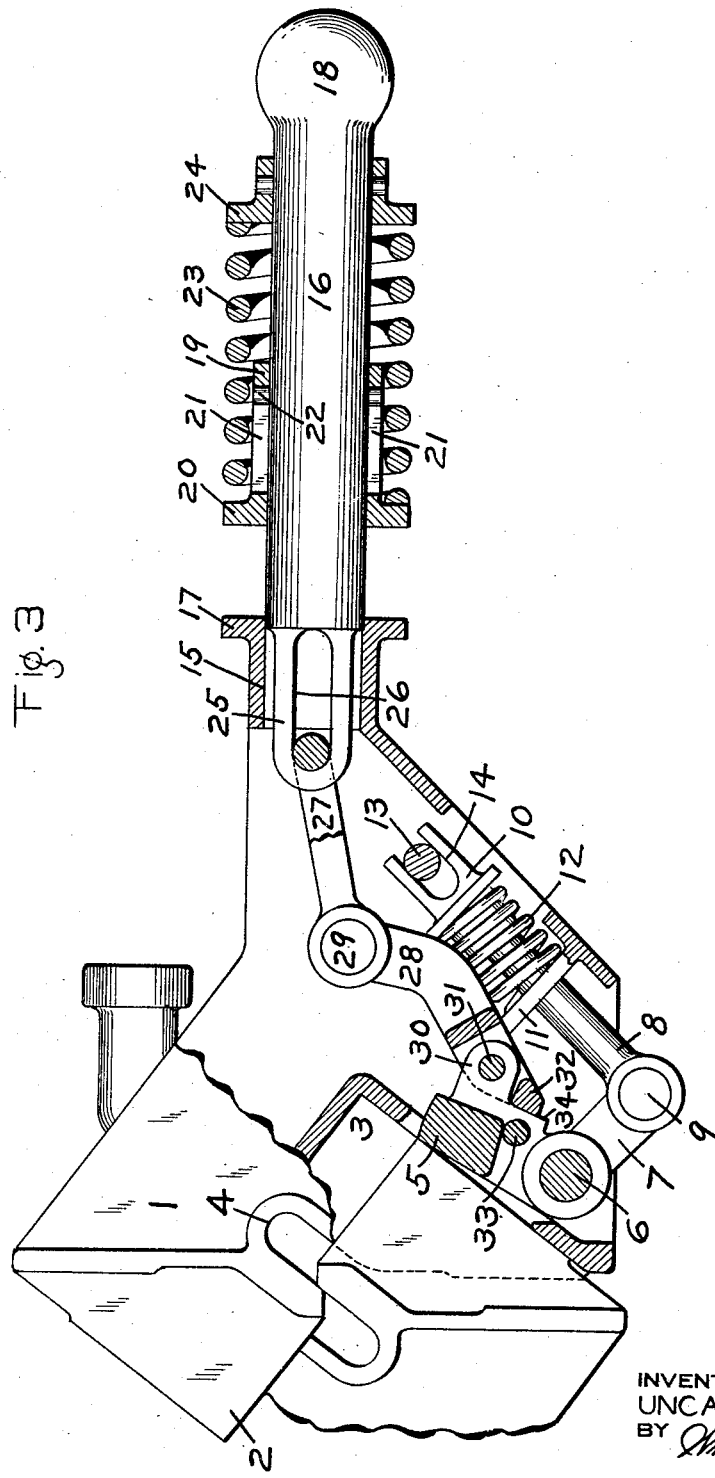

Patented May 19, 1931

1,806,567

UNITED STATES PATENT OFFICE

UNCAS A. WHITAKER, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA

COUPLER UNLATCHING DEVICE

Application filed September 17, 1928. Serial No. 306,445.

This invention relates to automatic train pipe couplings, and more particularly to the type known as the tight or rigid lock coupling.

An object of the invention is to provide a train pipe coupling of the above mentioned type with improved means for locking the coupling with a counterpart coupling when the two couplings are in the coupled position.

Another object of the invention is to provide locking means for train pipe couplings which are quickly released when the couplings are separated.

Another object of the invention is to provide a train pipe coupling of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings; Figure 1 is a plan, partly in section, of an automatic train pipe coupling embodying my invention, showing the same in uncoupled position; Fig. 2 is a section taken on the line 2—2 of Fig. 1; and Fig. 3 is a view similar to Fig. 1 showing the coupling in the position in which the latch releases the counterpart coupling.

Train pipe couplings of the type known as the tight or rigid lock coupling, are shown for example, in the Westinghouse Patent No. 708,747, dated September 9, 1902, and in which each coupling head is provided with a laterally projecting hook-shaped portion adapted to engage the corresponding portion of a counterpart coupling by a relative lateral movement, and be rigidly locked together by cam levers or latches, one pivoted upon each coupling head and bearing against the other counterpart coupling head.

While a coupling of the above type will automatically couple with a counterpart coupling when two cars are brought together, it is necessary to manually operate the cam levers, when it is desired to uncouple, in order to release the locking of the coupling heads and thus permit the coupling heads to separate, when the cars are pulled apart.

By the present invention, means are provided for automatically releasing the cam levers or latches when the coupling heads are separated.

Referring to the drawings, the automatic train pipe coupling head 1 comprises a projecting nose 2 adapted to engage in a recess 3 of a counterpart coupling head. The head 1 is provided with a hook portion 4 adapted to engage and interlock with a corresponding hook portion of a counterpart coupling head.

A cam or latch lever 5 is pivoted at 6 in the coupling head. The lever 5 carries an arm 7 to which a rod 8 is pivotally connected by a pin 9. A member 10 is secured to the outer end of the rod 8, and interposed between said member and a fixed abutment 11 is a coil spring 12. A guide pin 13, secured to the coupling head, is adapted to engage in a slot 14 in the member 10.

The rear end of the coupling head is formed with an opening 15 which constitutes a guide for the forward end of a stem 16. The end face of the coupling head is extended to provide a flange 17.

The stem 16 has its rear end provided with a ball section 18 adapted to be mounted in a socket (not shown) carried by the car.

Carried by the stem 16 is a sleeve 19 having one end flanged at 20 for abutting the flange 17. The sleeve 19 is formed with diametrically disposed longitudinal slots 21 into which extend the projecting ends of a pin 22 passed through the stem 16.

A coil spring 23 encircles the stem 16 and the sleeve 19, one end of the spring bearing against the flange 20, while the opposite end thereof bears against a collar 24 at the inner end of the stem. The spring 23 is normally under initial compression which tends to hold the parts in the position shown, with the pin 22 engaging the extreme ends of the slots 21. However, the spring 23 is adapted to be compressed to permit telescoping of the stem 16 and the coupling when two cars are coupled together, whereby the forward end of the stem will be disposed further into the coupling head for a purpose to be described.

At the front end, the stem 16 is provided with an extended portion 25 having a longitudinal slot 26 and engaging in said slot is a link 27 which is connected to a lever 28 by a pivot 29.

The lever 28 is connected to an arm 30 projecting laterally from the cam lever 5 by a pin 31. The extremity of the lever 28, beyond the pin 31, is formed with a relatively broad nose 32. This nose is adapted to engage a stop provided by a pair of opposed pins 33 projecting inwardly from the walls of the coupling head 1 and also a shoulder 34 with which the lever 5 is provided.

Referring to Fig. 2, it will be noticed that the portion of the lever 5 having the shoulder 34 is disposed between the ends of the pins 33. The pins are so positioned that when the mechanism is actuated, in the manner hereinafter described, the nose 32 first engages the pins 33 and then engages the shoulder 34, the arrangement of the parts being such that the coupling head locking means is actuated by a toggle leverage system.

In operation, when cars are brought together for coupling up, the projecting nose 2 of one train pipe coupling enters the recess 3 of the counterpart coupling, and the hooked portions 4 of the two couplings become interlocked through the relative lateral and longitudinal movement.

When the train pipe coupling head on each car moves rearwardly on the stem 16, the sleeve 19 will be carried with it, thereby compressing the spring 23 between the flange 20 and collar 24 which are brought closer together.

When the coupling head and stem 16 are thus telescoped together, the U-shaped link 27 will be carried rearwardly of the slot 26 and the pressure of spring 12 will force the cam lever 5 outwardly in the path of the nose 2 of the counterpart coupling and thus lock the two coupling heads tightly together when the hooked portions 4 become interlocked.

Inasmuch as the coupling head will be held telescoped on the stem 16, while the cars are coupled, the loop end of the link 27 will not engage the outer end of the slot 26. Therefore, the cam lever 5 will be retained in locked position by the pressure exerted by the spring 12, and will remain in such position as long as the cars remain coupled by virtue of the lost motion provided by the slotted connections between the several parts which permits slight relative movement of the head 1 on the stem 16 without actuating the locking mechanism.

However, when coupled cars are separated, the coupling head 1 which is interlocked with a counterpart coupling head will be pulled outwardly on the stem 16 until further longitudinal movement is prevented by the pin 22 engaging the ends of the slots 21, as shown in Fig. 1. This action also pulls the link 27 towards the outer end of the slot 26, thereby causing the lever 28 to swing on the pin 31 and force the nose 32 of lever 28 into engagement with the pins 33. These pins then function as a fulcrum and the long arm of the lever 28 will draw the cam lever 5 inwardly from the projected positions illustrated. Further outward movement of the coupling head 1 with respect to the stem 16 causes the nose 32 to engage the shoulder 34 of lever 5 and swing the same on pivot 6 out of the path of the nose 2 of the counterpart coupling head, thereby releasing the same.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. A coupling device comprising a coupling head, a latch for locking said head in engagement with a counterpart coupling head, and a lever engaging one fulcrum for initially moving said latch from its locking position and then engaging another fulcrum for further movement of said latch.

2. The combination with a train pipe coupling having movable locking means, of means for actuating said locking means comprising a jointed lever engaging one fulcrum for initially moving the locking means from its locking position and then engaging another fulcrum for further movement of said locking means.

3. The combination with a train pipe coupling having a fixed portion and a coupling head movably mounted thereon, means carried by the coupling head for locking the head with a counterpart coupling, and a jointed lever connecting the locking means and the fixed portion for operating the locking means upon relative movement of the coupling head with respect to the fixed portion.

4. The combination with a train pipe coupling having a fixed portion and a coupling head movably mounted thereon, means carried by the coupling head for locking the head with a counterpart coupling, and a jointed lever connecting the locking means and the fixed portion for operating the locking means upon relative movement of the coupling head with respect to the fixed portion, said lever engaging one fulcrum for initially moving the locking means from its locking position and then engaging another fulcrum for further movement of said locking means.

5. The combination with a train pipe coupling, a stem carried by the car and slidably mounted in the coupling, a spring for retaining the coupling extended with respect to the stem when the coupling is uncoupled and adapted to be compressed upon movement of the coupling with respect to the stem whereby the one is telescoped within the other when cars are coupled, a locking lever associated with the coupling, and a toggle connecting the stem and the locking lever, said toggle engaging one fulcrum for initially moving the locking lever from its locking position upon movement of the coupling outwardly of the stem and then engaging another fulcrum for further movement of said locking lever upon further movement of the coupling outwardly of the stem.

6. The combination with a train pipe coupling, a stem carried by the car and slidably mounted in the coupling, a locking lever associated with the coupling, and a toggle having a lost motion connection with said stem and operatively connected to said locking lever, said toggle engaging one fulcrum for initially moving the locking lever from its locking position, and then engaging another fulcrum for further movement of said locking means upon continued movement of the coupling relative to said stem.

7. The combination with a train pipe coupling having a cam lever for locking the coupling in coupled relation with a counterpart coupling, of a toggle lever operated upon a predetermined movement of the coupling relative to the car and engaging one fulcrum for initially moving the car lever from its locking position and then engaging another fulcrum for further movement of said cam lever.

In testimony whereof I have hereunto set my hand, this 15th day of September, 1928.

UNCAS A. WHITAKER.